United States Patent [19]

Korevaar

[11] Patent Number: 4,535,443

[45] Date of Patent: Aug. 13, 1985

[54] TERMINAL ARRANGEMENT FOR A DUPLEX TRANSMISSION SYSTEM

[75] Inventor: Geerlof J. Korevaar, Hilversum, Netherlands

[73] Assignee: U.S. Philips Corporation, New York, N.Y.

[21] Appl. No.: 504,101

[22] Filed: Jun. 15, 1983

[30] Foreign Application Priority Data

Jun. 16, 1982 [NL] Netherlands ................... 8202438

[51] Int. Cl.³ ...................... H04B 1/58; H04B 3/04
[52] U.S. Cl. .................................. 370/24; 375/7; 375/14; 333/18
[58] Field of Search ................. 333/18; 455/79; 179/170.2; 375/7, 11, 12, 14, 60; 370/24, 25, 32; 178/69 R, 69 N

[56] References Cited

U.S. PATENT DOCUMENTS

| | | | |
|---|---|---|---|
| 4,238,779 | 12/1980 | Dickinson et al. | 370/24 |
| 4,355,214 | 10/1982 | Levy et al. | 179/170.2 |
| 4,377,858 | 3/1983 | Treiber | 370/24 |
| 4,450,555 | 5/1984 | Pays | 375/11 |

Primary Examiner—Benedict V. Safourek
Attorney, Agent, or Firm—Thomas A. Briody; William J. Streeter; Leroy Eason

[57] ABSTRACT

A terminal for a duplex transmission system for digital signals, which includes an adaptive quantized equalizer for reception and a pulse-shaping equalizer for transmission. The correction factors for the transmission equalizer are derived from the adaptively adjustable coefficients of the reception equalizer, the derivation being effected in accordance with recursive expressions which signify minimum intersymbol interference between successive pulses in a received digital signal.

2 Claims, 8 Drawing Figures

| t0 | t1 | t2 | t3 | t4 | ---- | | |
|----|----|----|----|----|------|---|---|
| C0 | C1 | C2 | C3 | C4 | ---- | ---- | ---- |
| | α1 C0 | α1 C1 | α1 C2 | α1 C3 | α1 C4 | ---- | ---- |
| | | α2 C0 | α2 C1 | α2 C2 | α2 C3 | α2 C4 | ---- |
| | | | α3 C0 | α3 C1 | α3 C2 | α3 C3 | α3 C4 |
| | | | | α4 C0 | α4 C1 | α4 C2 | α4 C3 |

$t_0$: $C_0 = 1$ $t_1$: $C_1 + \alpha_1 C_0 = 0$ $\quad \alpha_1 = -C_1$ $t_2$: $C_2 + \alpha_1 C_1 + \alpha_2 C_0 = 0$ $\quad C_2 - (C_1)^2 + \alpha_2 = 0$ $\quad \alpha_2 = -(C_2 - (C_1)^2)$ $t_3$: $C_3 + \alpha_1 C_2 + \alpha_2 C_1 + \alpha_3 C_0 = 0$ $\quad C_3 - C_1 C_2 - (C_2 - (C_1)^2) C_1 + \alpha_3 = 0$ $\quad \alpha_3 = -(C_3 - 2C_2 C_1 + (C_1)^3)$ $t_4$: $C_4 + \alpha_1 C_3 + \alpha_2 C_2 + \alpha_3 C_1 + \alpha_4 C_0 = 0$ $t_n$: $C_n + \alpha_1 C_{n-1} + \alpha_2 C_{n-2} + \cdots \alpha_n C_0 = 0$

TERMINAL ARRANGEMENT FOR A DUPLEX TRANSMISSION SYSTEM

A. BACKGROUND OF THE INVENTION

A (1) Field of the Invention

The invention relates to a terminal arrangement for a duplex transmission system for digital signals, comprising a transmitting arrangement and a receiving arrangement and a coupling arrangement for coupling the transmitting and receiving arrangements to a duplex transmission path, the receiving arrangement comprising an equalizer for reception and the transmitting arrangement comprising an equalizer for transmission and means being provided for adjusting the equalizer for transmission in response to the received digital signals in combination with the equalizer for reception.

The terminal arrangement is, for example, intended for a digital subscriber connection in a two-wire full-duplex system, which has for its object to replace and improve existing analog subscriber connections, the existing subscribers' lines being utilised.

The frequency band required for such a system may be between approximately 0, 1–200 kHz.

When equipment for the system is being installed, only a few details will be known of the subscribers' lines, such as, for example: length, diameter, cross-talk signals, interferences and the number of stubs, and equalization will be required which can automatically adapt itself for an optimum reception.

An adaptive quantized feedback equalizer (AQF-equalizer) satisfies this requirement. This equalizer adapts itself continuously to a maximum eye opening of the digital signal.

In principle such an equalizer would be required at the subscriber set as well as in the exchange.

In order to keep the dissipation in the subscriber set as low as possible, and to prevent the subscriber set from being unnecessarily expensive, methods to have the pulse correction be effected in the exchange only are sought for.

A (2) Description of the Prior Art

Generally, cable losses are corrected by means of an equalizing network or a pulse-shaping method. Equalization may, in principle, be effected at the beginning or at the end of a transmission path, while pulse-shaping is usually effected afterwards, that is to say at the receiving side.

In its most simple form an equalizing network is an RC-circuit with which the attenuation variation of the cable is indeed equalized, but an unwanted phase shift is introduced at the same time. As a result thereof, the correction of digital signals will not be optimal.

The cross-talk signals from adjacent wire pairs in a cable are the stronger according as the frequency of the noise signals becomes higher. Equalization by means of a network now has the effect that at high frequencies these noise signals will be still more amplified, relatively so that the signal-to-noise ratio is considerably affected.

A great disadvantage of this equalization is therefore the decrease in the signal-to-noise ratio, as a result of which the maximum useful cable length decreases.

For digital signals the quality of the transmission is determined by the number of bit errors produced during regeneration. This number of errors is determined by the extent to which the so-called eye is still sufficiently open.

In order to ensure that the intersymbol interference is as low as possible, it is a requirement that at the sampling moments which are located at n-times the bit period ($t = n\tau$), the signal obtained in response to the preceding data pulses must be as small as possible.

The equalizer for transmission provides that intersymbol interference at the receiving end is as small as possible. This method is used at the transmitter instead of at the receiver.

A terminal arrangement of the type described in A(1) is disclosed in Japanese Pat. No. 884,474, issued Sept. 30, 1977, in which the equalization for the return direction is derived from the receiving arrangement, it being assumed that the return line is equal to the receiving line.

B. SUMMARY OF THE INVENTION

The invention has for its object to provide a simple construction of the terminal arrangement of the type set forth in the opening paragraph.

According to the invention, the terminal arrangement is characterized in that the equalizer for reception is provided by an adaptive quantized feedback equalizer having adaptively adjustable coefficients ($C_1$, $C_2$, $C_3$, ...) and that the equalizer for transmission is provided by a pulse-shaping equalizer which generates a number (n) of variably delayed versions of the digital input signal and after multiplication of these versions by an associated correction factor ($a_n$) adds them to the digital input signal for forming a predistorted digital transmit signal and that a converter arrangement is provided for converting the adaptively adjustable coefficients of the said feedback equalizer into the correction factors for the pulse-shaping equalizer in accordance with the recursive expressions:

$$C_1 + a_1 = 0$$

$$C_2 + a_1 C_1 + a_2 = 0$$

$$C_n + a_1 C_{n-1} + a_2$$

$$C_{n-2} + \ldots + a_n = 0$$

The correction method for the transmit signal utilizes the coefficients found in the transversal filter of the AQF equaliser. The coefficients found correspond to the values of the samples of the impulse response of the transmission path. As generally a cable behaves as a RC-network whose impulse response has an $e^{-t/RC}$ character, a first correction of the transmit signal by $a_1 = -C_1$ is in that case sufficient to realise an impulse response having a small residual value at the subsequent sampling moments.

When this method is used, the noise signals and the cross-talk signals are not amplified, so that the signal-to-noise ratio is not detoriated.

C. SHORT DESCRIPTION OF THE FIGURES

FIG. 1 shows the block diagram of an embodiment of the terminal arrangement according to the invention, FIG. 2 illustrates the impulse response of a cable;

FIGS. 3a–b show a Table and a set of equations deriving the correction factors for the equalizer for transmission;

D. REFERENCE

Equalisation of Data Transmission Channels by Means of Adaptive Quantized Feedback, Werner Adrexser, AEU, Vol. 34 (1980), No. 7/8 pp. 287–292.

E. DESCRIPTION OF THE EMBODIMENTS

Figure 1:
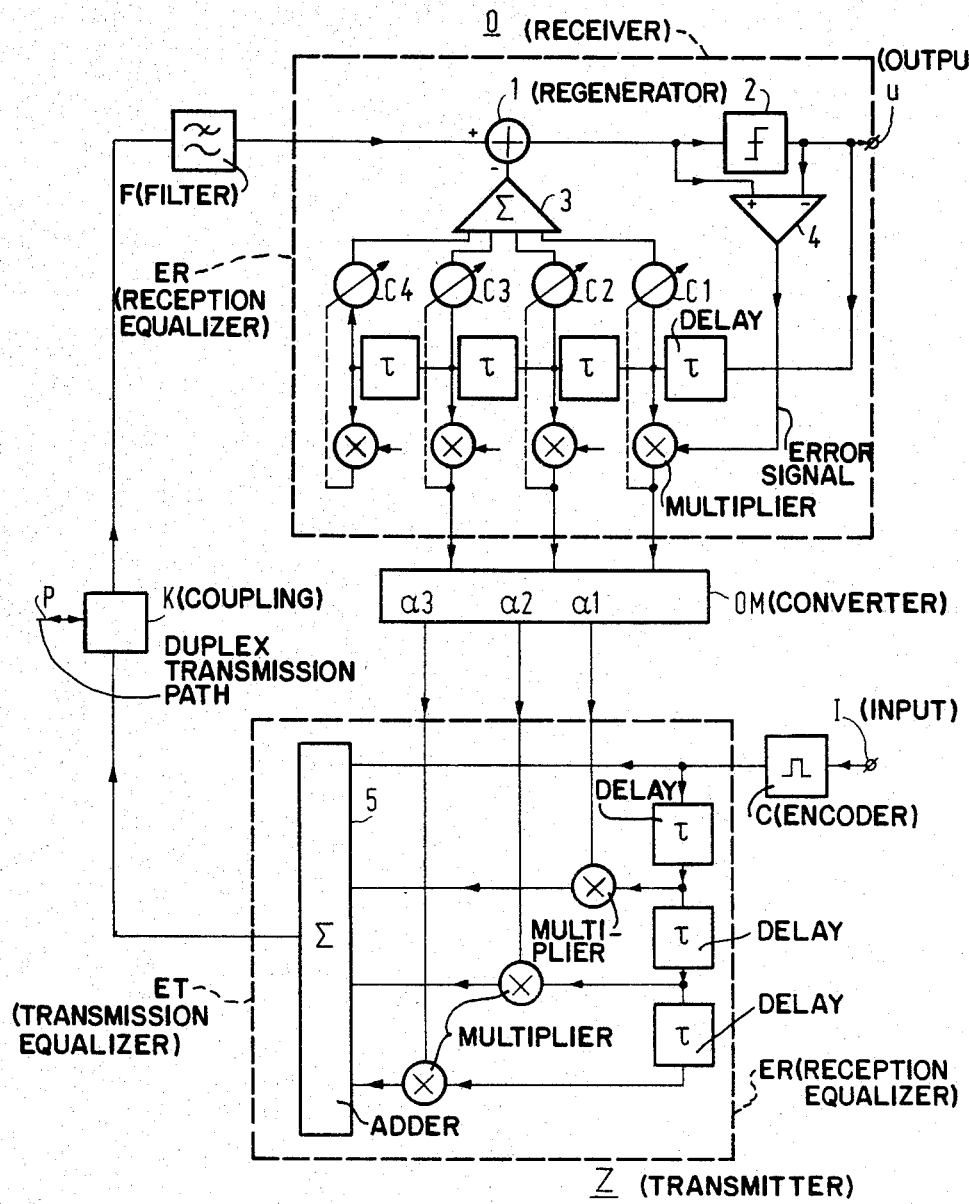

The terminal arrangement shown in FIG. 1 comprises a transmitting arrangement Z, a receiving arrangement O and a coupling arrangement K for coupling the transmission and receiving arrangements to a duplex transmission path P.

Depending on the transmission mode used, the coupling arrangement K can be implemented in different manners. When the burst method is used the coupling arrangement K is in the form of a change-over switch which alternately connects the transmitting arrangement and the receiving arrangement to the transmission path. When simultaneous transmission in both signal directions is used, the coupling arrangement is in the form of a hybrid in combination with an echo canceller. These components are known and need no further description.

The receiving arrangement O comprises a receiving filter F and an equalizer for reception ER, which has an output U for the regenerated digital signal.

Figure 7:
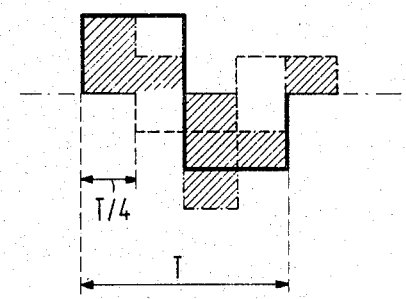
FIG. 7 illustrates an example of the corrected bi-phase wave form.

The transmitting arrangement has an input I for a digital signal, an encoder arrangement C and an equalizer for transmission ET. Depending on the transmission code used, the encoding arrangement C may be implemented in different ways. When the NRZ-signal form is used, considered over the symbol interval, the encoding arrangement C produces a signal which does not change during the symbol period (T). In the event of bi-phase encoding the encoding arrangement C produces the bi-phase waveform in each symbol interval. This waveform has a transition halfway along the symbol interval: the solid line in FIG. 7 illustrates this waveform.

The equalizer for reception ER is provided by an adaptive quantised feedback equalizer of a type which is known per se, for example from the sub. D. reference.

In a difference producer 1 a compensation signal is substracted from the output signal of filter F. The output signal from difference producer 1 is applied to a regenerator 2, which produces a regenerated digital signal at the output U.

The regenerated digital signal is applied to a cascade arrangement of delay sections ($\tau$). After having been multiplied by the adaptive, adjustable coefficients C1, C2, C3 and C4 in the correspondingly referenced multipliers, the output signals of these sections are added together in an adder circuit 3 for forming the compensation signal.

A differential amplifier 4 derives from the input and the output of the regenerator 2 an error signal which is applied to a set of multipliers (x) for multiplication by the output signals of the delay sections ($\tau$). The coefficients C1, . . . C4 are derived from the output signals of the multipliers (x).

The coefficients C1, . . . C4 automatically adjust themselves such that the impulse response of the transmission path P which is sampled by regenerator 2 at the instant t=0 is compensated for at the instants t=n$\tau$.

Figures 2, 3A, 3B:
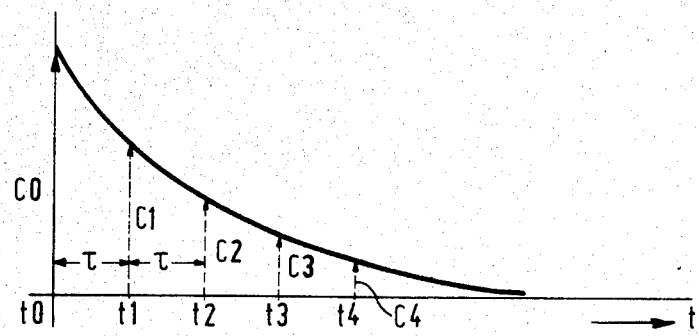

FIG. 2 illustrates the impulse response of a subscriber line to a NRZ pulse. Herein Co is the signal value at the sampling instant $t_o$=0 and C1, . . . C4 are the signal values at the instant $t_n$=n$\tau$. These values correspond to the coefficient values C1, . . . C4 of the equalizer for reception ER, (it being assumed that Co=1).

The equalizer for transmission ET is formed by a pulse-shaping equalizer of a known type.

The output signal of encoder arrangement C is applied to a cascade arrangement of delay section ($\tau$). After having been multiplied by the correction factors $\alpha$1, $\alpha$2 and $\alpha$3 in a set of multipliers (x) the output signals of these sections are added together and added by adder arrangement 5 to the output signal of encoder arrangement C for forming a predistorted digital transmit signal. This predistorted digital output signal is applied to the coupling arrangement K for transmission over the transmission path P.

The terminal arrangement shown in FIG. 1 comprising a converter arrangement OM, which converts the coefficients C1, . . . C3 from the equalizer for reception ER into the correction factors $\alpha$1, . . . $\alpha$3 for the equalizer for transmission ET.

The equalizer for transmission ET has for its object to provide by predistortion of the transmitted signals a response at the receiving end which approximates to zero at the instants tn=n$\tau$ (n≠0).

The Table of FIG. 3$a$ shows for the instants tn=n$\tau$ the response of the transmission path to a predistorted output pulse from equalizer ET. FIG. 3$b$ shows the recurrent expressions which the correction factors $\alpha$n must satisfy in order to make the response of the transmission path to the predistorted transmitting pulse equal to zero at the instant tn=n$\tau$ (n≠0).

The signal values C1, . . . Cn of the impulse response of the transmission path correspond to the adaptively adjusted coefficients C1, . . . Cn of the equalizer for reception ER. By converting by means of the converting arrangement OM the coefficients C1, . . . Cn of the equalizer ER into the corrrection factor $\alpha$n in accordance with the expressions of FIG. 3$b$, an equalizer for transmission operating to the desired goal will then be realised.

Figure 4:
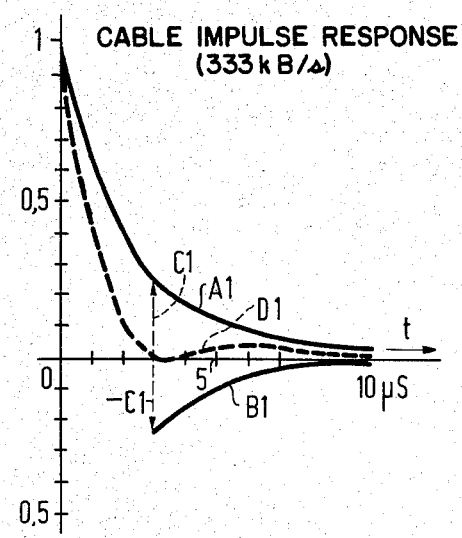
FIGS. 4 and 5 show corrected impulse responses for different bit rates.
Figure 5:
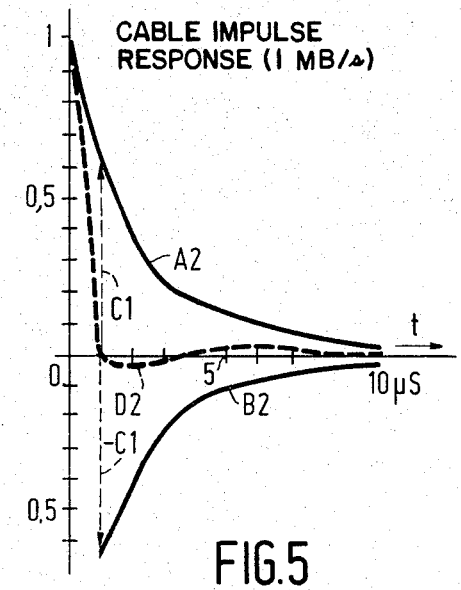

In practice it has been found possible to suffice with only the correction factor $\alpha$1 in the equalizer for transmission ET, that is to say to use only one correction pulse. For the case in which a subscriber cable having a length of 2 km and a diameter of 0.50 mm is used, the impulse response is illustrated in FIG. 4 by curve A1 and in FIG. 5 by curve A2. FIG. 4 relates to a bit rate of 333 kB/s ($\tau$=0.3 $\mu$s) on the transmission path and FIG. 5 to a bit rate of 1 MB/s ($\tau$=0.1 $\mu$s). For these cases the impulse response to the correction pulse is illustrated by means of the curves B1 and B2 and the ultimate response of the subscriber cable to the predistorted transmitting pulse is illustrated by means of the curves D1 and D2. From this it appears that the overall response at the instants t=n$\tau$ (n≠0) approximates already to a very satisfactory extent to the value zero. If necessary a second correction pulse can be used at the distance 2$\tau$ (correction factor $\alpha$2) in order to reduce still further the cable response at the instant t=2$\tau$ and the subsequent sampling instants.

Figure 6:
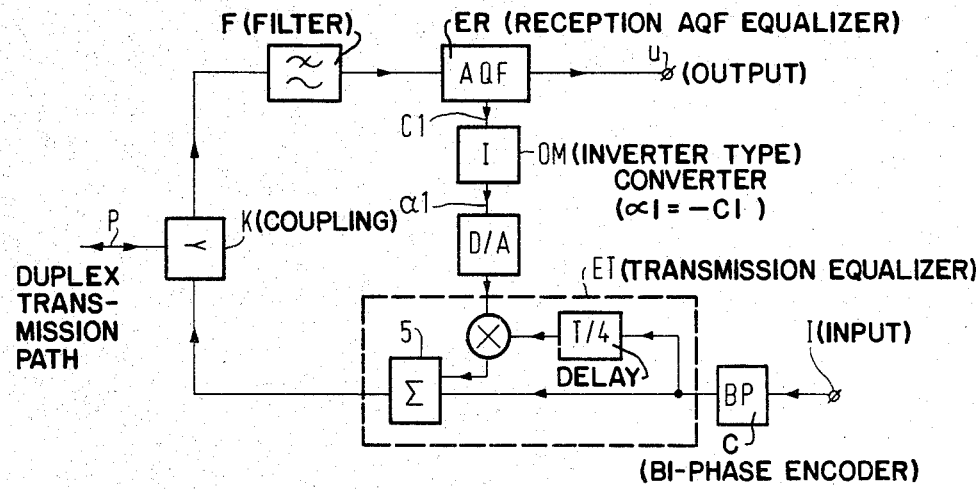
FIG. 6 shows the block diagram of a second embodiment of the terminal arrangement in accordance with the invention for bi-phase modulation.

FIG. 6 shows an embodiment of the terminal arrangement in accordance with the invention for bi-phase modulation. Components corresponding with those shown in FIG. 1 are referenced correspondingly.

The spectrum of bi-phase modulation extends from 0 HZ to twice the bit frequency (2/T), wherein T represents the symbol period in sec. In accordance with the sampling theorem, such a signal must be sampled with a frequency fs=$1/\tau$=4/T, so that here is must hold that $\tau$=T/4.

The equalizer for transmission ET comprises only one delay section $\tau$=T/4 and an analog multiplier (x). The converter arrangement OM is here provided by a simple inverter, which realizes the relation $\alpha 1 = -C1$. A D/A converter converts the value of $\alpha 1$ into an analog signal and applies it to the analog multiplier (x) in the equalizer for transmission ET.

In FIG. 7 the solid line illustrates the bi-phase signal waveform at the output of encoding arrangement C. The broken line illustrates the correction pulse ($\alpha 1 = -\frac{1}{2}$) which is shifted a period of time $\tau$=T/4 and the dot-and-dash line illustrates the predistorted output pulse of equalizer ET.

It will be seen that the above-described principles can be used irrespective of whether binary signal pulses or signal pulses having more than two values are transmitted. For the latter case the system components must however be arranged for processing multilevel pulses and, for example, the regenerator 2 shown in FIG. 1 must be capable of regenerating multi-level signals.

It will further be seen that the described principles can be used independently of the code produced by encoder arrangement C. Account must only be taken of the bit rate at the output of encoder arrangement C, which when, for example, bi-phase modulation is used is doubled with respect to the original bit rate. Moreover, the line code at the transmitting end need not be the same as the line code at the receiving end.

What is claimed is:

1. A terminal for a transmission system having a duplex transmission path for transmitted and received digital signals, comprising:

a transmitter which includes a pulse-shaping equalizer for generating a number (n) of variably delayed versions of the digital signal to be transmitted, multiplying such versions by respective correction factors ($\alpha 1, \alpha 2, \ldots \alpha_n$) and adding such multiplied versions to the digital signal to be transmitted, thereby predistorting such digital signal;

a receiver which includes an adaptive quantized feedback equalizer having adaptively adjustable coefficients ($C1, C2, \ldots C_n$);

and converter means coupling said transmitter equalizer to said receiver equalizer, said converter means being adapted to convert the adaptively adjustable coefficients ($C1, C2, \ldots C_n$) of the receiver equalizer into the correction factors ($\alpha 1, \alpha 2, \ldots \alpha_n$) for the pulse-shaping transmission equalizer in accordance with recursive expressions which signify minimum intersymbol interference between successive pulses in received digital signals.

2. A terminal in accordance with claim 1, wherein said recursive expressions are:

$$C1 + \alpha 1 = 0$$

$$C2 + \alpha 1 C1 + \alpha 2 = 0$$

$$\ldots$$

$$Cn + \alpha 1 Cn-1 + \alpha 2 Cn-2 + \ldots + \alpha n = 0.$$

* * * * *